Aug. 29, 1961  J. M. BRICAUD  2,998,570
ARRANGEMENTS FOR THE SIMULTANEOUS REMOTE
MEASUREMENT OF VARIOUS MAGNITUDES
Filed March 31, 1958  3 Sheets-Sheet 1

INVENTOR.
JOSEPH MARIE BRICAUD
BY
*Brumbaugh, Free, Graves & Donohue*
his ATTORNEYS.

Aug. 29, 1961

J. M. BRICAUD 2,998,570

ARRANGEMENTS FOR THE SIMULTANEOUS REMOTE
MEASUREMENT OF VARIOUS MAGNITUDES

Filed March 31, 1958

3 Sheets-Sheet 3

INVENTOR.
JOSEPH MARIE BRICAUD

BY his   ATTORNEYS.

United States Patent Office 2,998,570
Patented Aug. 29, 1961

2,998,570
ARRANGEMENTS FOR THE SIMULTANEOUS REMOTE MEASUREMENT OF VARIOUS MAGNITUDES
Joseph Marie Bricaud, Suresnes, France, assignor to Societe de Prospection Electrique, Procedes Schlumberger, Paris, France, a corporation of France
Filed Mar. 31, 1958, Ser. No. 725,403
Claims priority, application France Apr. 1, 1957
10 Claims. (Cl. 324—114)

When it is desired to measure simultaneously from a distance a number of magnitudes in the form of electrical parameters such as differences in potential, one is led with a view to reducing the number of electric leads required for the transmission of the measured values, to resort to a common return lead for the different circuits feeding the different measuring instruments. This is the case in particular when a plurality of simultaneous measurements are made with a view to obtaining the values of the apparent electric resistivity of the geological strata inside a bore hole (electric drill coring), said measurements leading to the showing of differences in alternating voltage between a number of electrodes immersed in the bore hole in the vicinity of the geological structure to be investigated, the values of these differences in potential being transmitted to measuring instruments such as galvanometers arranged over ground, one of the leads feeding one of the electrodes forming the common lead for a number of circuits.

Said method which consists in using a common return lead for different measures leads however to the drawback of producing between the different circuits an interdependence or flutter whereby each of the values measured and given out by one measuring instrument is entailed with an error due to the existence of currents passing through the common lead and corresponding to the measurements made by the other measuring instruments.

Figure 1:
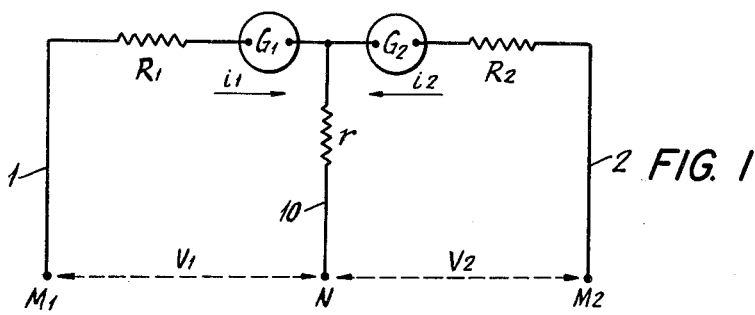

The following example illustrated in the accompanying FIG. 1 will allow a better understanding of the phenomena to be considered. In this example, it is desired to measure the differences in potential $V_1$ and $V_2$ applied, on the one hand, between points $M_1$ and $N$ and, on the other hand, between the points $N$ and $M_2$, said differences in voltage forming indications of the magnitudes which are to be defined. To this end, galvanometers $G_1$ and $G_2$ are inserted in the circuit in a manner such as will allow measuring said differences in voltage, said galvanometers being connected with $M_1$ and $M_2$ through the leads 1 and 2 respectively, and with $N$ through the lead 10 which is common to both circuits between the points $P$ and $N$. Assuming $R_1$ designates the resistance of the lead 1, $R_2$ the resistance of the lead 2 and $r$ the resistance of the common lead 10 and if furthermore: $i_1$ and $i_2$ designate the actual intensity flowing through the galvanometers $G_1$ and $G_2$.

$I_1$ the intensity passing through the galvanometer $G_1$ when $V_2=0$, $I_2$ being the intensity passing through the galvanometer $G_2$ when $V_1=0$.

Assuming also the circuits are gauged in a manner such that the deflection corresponding to the intensities $I_1$ and $I_2$ form the measures of $V_1$ and $V_2$, the errors in measurements both absolute and relative in the two circuits ascribable to the fluttering phenomena referred to hereinabove may be defined by the amounts:

$$\Delta I_1 = i_1 - I_1, \text{ and } \frac{\Delta I_1}{I_1} \text{ in circuit 1}$$

$$\Delta I_2 = i_2 - I_2, \text{ and } \frac{\Delta I_2}{I_2} \text{ in circuit 2}$$

A simple calculation shows that:

$$i_1 = I_1 - \frac{r}{R_2} \frac{V_2}{R_1 + \frac{R_2 r}{R_2 + r}}$$

or, if $Z_1$ is the resistance of the measuring circuit 1 as seen across $M_1N$:

$$Z_1 = R_1 + \frac{R_2 r}{R_2 + r}$$

and $$i_1 = I_1 - \frac{r}{R_2} \frac{V_2}{Z_1} \quad (1)$$

Similarly $$i_2 = I_2 - \frac{r}{R_1} \frac{V_1}{Z_2} \quad (2)$$

This leads to:

$$\Delta I_1 = -\frac{r}{R_2} \frac{V_2}{Z_1} \quad (3)$$

$$\frac{\Delta I_1}{I_1} = -\frac{r}{R_2} \frac{V_2}{V_1} \quad (4)$$

or with a permutation of the indicia:

$$\Delta I_2 = -\frac{r}{R_1} \frac{V_1}{Z_2} \quad (5)$$

$$\frac{\Delta I_2}{I_2} = -\frac{r}{R_1} \frac{V_1}{V_2} \quad (6)$$

These formulae show firstly that if the magnitudes of $V_1$ and $V_2$ are substantially different as in the case of measurements executed in a bore-hole wherein the values of $V_1$ may for instance be generally of an order four times higher than that of the values of $V_2$, the absolute error and the relative error relating to the value of $I_2$ are very high and in fact the relative error may reach 25%, a figure which cannot be allowed. If, as may occur, $V_1$ becomes much larger than four times $V_2$, $I_2$ may even assume a negative value.

It has already been attempted to reduce this drawback by acting on the different parameters of the circuit. Although the resistance $r$ of the lead is defined in practice to a large extent by the actual conditions of operation of the apparatus, which means that it is hardly possible to act on said parameters, it is possible however to improve the measurements made by increasing $R_1$ and $R_2$ which leads of course to the necessity of increasing the sensitivity as to voltage of the measuring circuits, or else, of increasing the current sent into the circuits, but such arrangements in addition to its complication lead to further drawbacks. These drawbacks may however be cut out by the introduction of amplifiers in measuring circuits, but this leads to intricate structures and also to certain drawbacks in practice.

The present invention has for its object to cut out these drawbacks and to remove almost completely and in a simple manner the errors due to fluttering. It allows removing these errors, not only in the case of two circuits including a common lead, but also in the case of any number of circuits including a common lead.

The invention relies on the fact that, as shown by the formulae, the errors in each of the circuits are proportional to measured voltages in the other circuits. Consequently, in accordance with the invention and in the case of several circuits having a common lead, there is provided a transformer or a system of transformers, the windings of which are distributed between the different circuits outside the common lead, these different windings being arranged in a manner such as will induce in the different circuits currents which allow cutting out at least the major part of the errors due to the presence of the common lead.

In the particular case of two circuits only which include a common lead, a single transformer is used which is provided with two windings mounted respectively in the two circuits outside their common lead and the characteristic data of which are defined in the manner disclosed hereinafter with reference to the accompanying FIG. 2.

In accompanying drawings, FIG. 1 is, as mentioned hereinabove, an explanatory diagram.

FIGS. 2 to 8 are wiring diagrams illustrating various embodiments of the invention.

Figure 2:
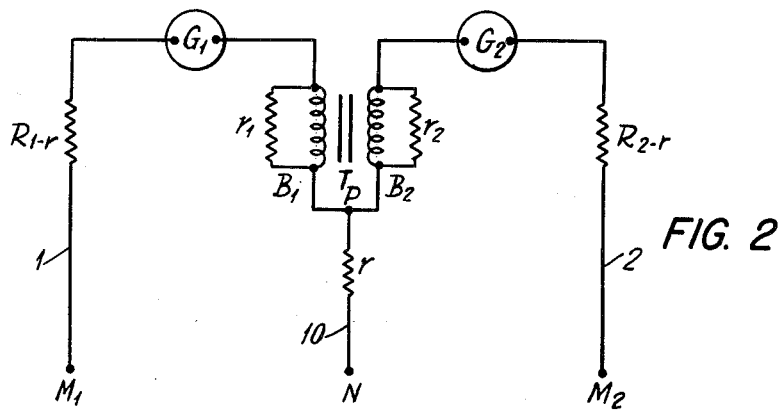

Turning to FIG. 2 and assuming $r$ designates the resistance of the common lead, the transformer designed, in accordance with the invention, may provide any desired transformation ratio $m$. To this end, it includes windings $B_1$ and $B_2$ which ensure said transformation ratio, said windings inserted in series respectively in each of the circuits 1 and 2 being shunted respectively by the resistances $r_1$ and $r_2$ inserted in said circuits, $r_1$ and $r_2$ being selected as functions of $r$ or of an average value of $r$, as will be disclosed hereinafter for the case where $r$ is liable to vary, in a manner such that the following relationship is obtained:

$$m\frac{r_2 r_1}{r_1 + m^2 r_2} = r \tag{7}$$

Experience agrees with theory and shows that in this case the errors referred to hereinabove were removed at least partly, the cutting out of the errors being more complete when the grade of the transformer was higher and the variations of the resistance $r$ were smaller.

In practice, it is possible to select in many cases $m=1$, i.e. a transformation ratio equal to 1 so that the transformer is entirely symmetrical. In this case, the above Equation 7 is reduced to:

$$\frac{r_1 r_2}{r_1 + r_2} = r \tag{8}$$

which can be written as follows:

$$\frac{1}{r_1} + \frac{1}{r_2} = \frac{1}{r} \tag{9}$$

Figure 3:
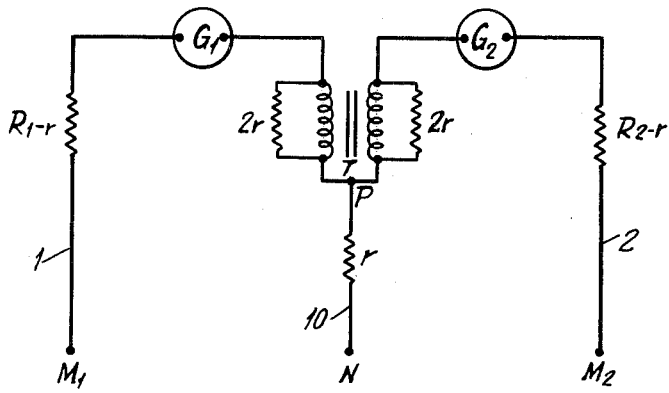
Figure 4:
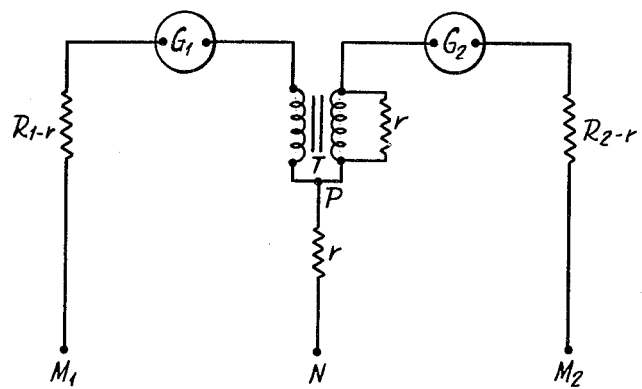

It is then possible to select for instance $$r_1 = r_2 = 2r \tag{10}$$

as illustrated in diagrammatic FIG. 3, or else:

$$r_2 = \infty \tag{11}$$
$$r_1 = r$$

as illustrated in the diagrammatic FIG. 4.

It may occur furthermore, in contradistinction, that it is of interest to have a value of $m$ different from 1. This is the case in particular when it is desired to obtain an apparent resistance which is smaller in one of the circuits with a view to obtaining for instance a larger sensitivity. In such a case, and assuming for instance the value of $r_2$ is chosen so as to be infinite, the apparent resistance in the circuit 1 is actually equal to $r \times m$ and in the circuit 2 to $r/m$.

Through a suitable selection of $m$, it is thus possible to obtain the desired sensitivity in the circuit requiring a high sensitivity provided of course that, in the other circuit, the sensitivity remains satisfactory.

Figure 5:
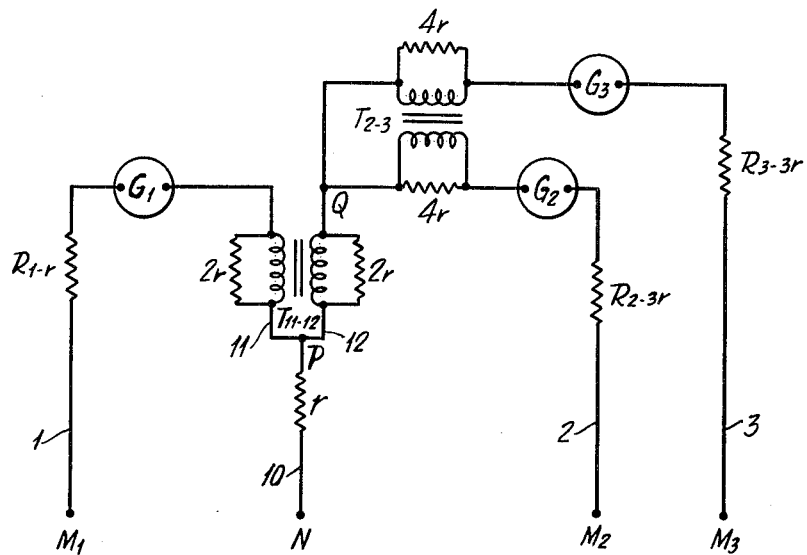

In the case where there are more than two circuits having a common lead, the problem may be solved either by means of a number of transformers or else by means of a single transformer incorporating a number of windings. An example of an arrangement of the first type is illustrated in FIG. 5 corresponding to the case of three circuits having a common lead. It is assumed in this particular case that it is desired to measure the differences in voltage $V_1$, $V_2$, $V_3$ between three couples of points N—$M_1$, N—$M_2$, N—$M_3$ inserted in three circuits 1, 2, and 3 having in common the lead 10, the resistance of which is equal to $r$. In this case, it is sufficient to provide at the output end P of the lead common to the three circuits and having a resistance $r$, two leads 11 and 12 forming respectively an extension of the lead 1 and a common section connected at Q with the leads 2 and 3.

The leads 11 and 12 feed respectively the windings of a first transformer $T_{11-12}$ designed in accordance with the rules disclosed for the case of an arrangement including only two circuits. This cuts out in the circuit 1 all the errors arising through the presence of the circuits 2 and 3 and it cuts out from the system of said circuits 2 and 3 the errors ascribable to the circuit 1 passing through $M_1$. Beyond the point Q, the circuits 2 and 3 separate and in the separate leads 2 and 3 are inserted the windings of a second transformer $T_{2-3}$ which transformer is calculated under the same conditions as in the case of the two-circuit arrangement including a common lead for the two circuits; the calculation is made however as if the resistances of the common lead were equal no longer to $r$ but to $2r$. In particular, the resistances shunting the windings of the transformer may both be equal to $4r$.

In the case where the number of circuits is higher than three, it is possible to generalize the method which has just been described, by resorting to a first transformer of which one winding is inserted in one of the circuits and the other in a section common to all the remaining circuits, and so on. It is thus possible to make up for the fluttering phenomena in a system including any number of circuits.

In another embodiment of my invention, I may use no longer a system of transformers with two windings, but a single transformer with multiple windings.

Figure 6:
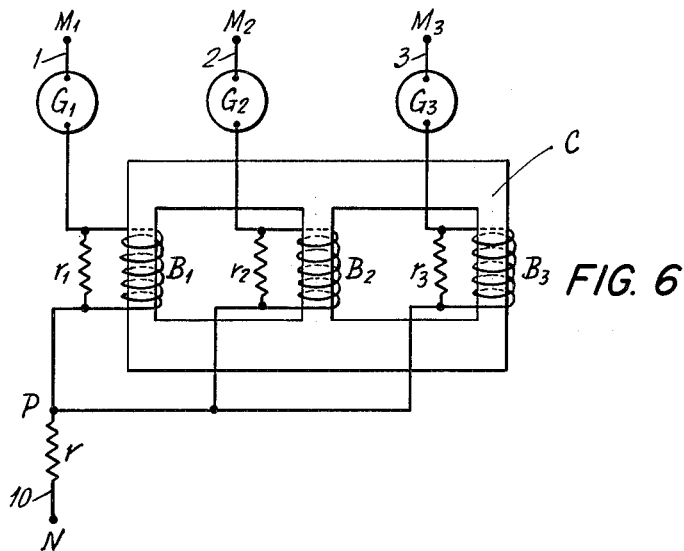
Figure 7:
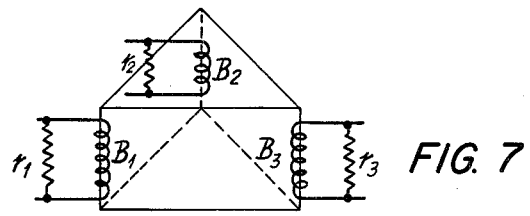
Figure 8:
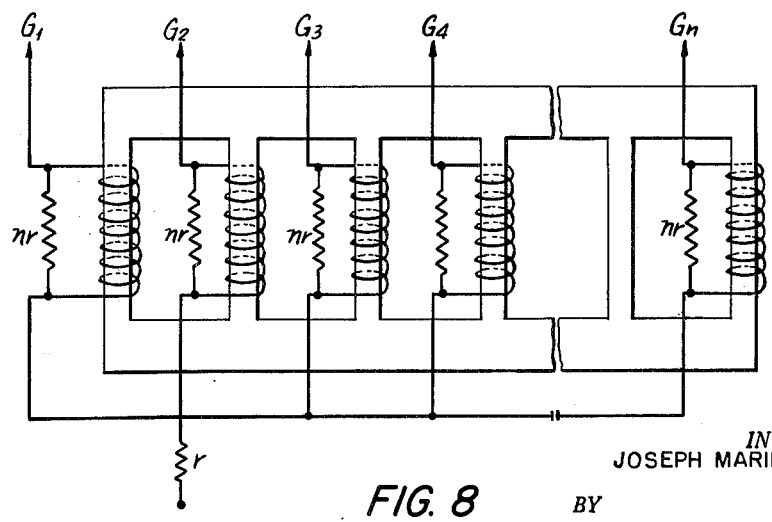

FIGS. 6 and 7 relates to embodiments of this last type, applicable to an arrangement including three circuits, and FIG. 8 to a similar arrangement including any number $n$ of circuits.

In FIG. 6, it is desired, as in the preceding case, to provide an arrangement adapted to measure the differences in potential between N and $M_1$, N and $M_2$, N and $M_3$ in the corresponding circuits 1, 2, 3 including a common lead 10 connected with a point P at which the leads 1, 2 and 3 separate. In the case illustrated, there is used a transformer $T_{1-2-3}$ with three windings $B_1$, $B_2$, $B_3$ wound respectively over the same magnetic circuit illustrated diagrammatically at C and of which the horizontal or transverse reluctance should be small. The three windings $B_1$, $B_2$, $B_3$ are shunted respectively by the resistances $r_1$, $r_2$, $r_3$ which should receive values which are functions of the number of convolutions $N_1$, $N_2$ and $N_3$ of the three windings, as provided by the following formulae:

$$\frac{r_1}{N_1} = \frac{r_2}{N_2} = \frac{r_3}{N_3} = r\left(\frac{1}{N_1} + \frac{1}{N_2} + \frac{1}{N_3}\right)$$

In the particular case where $N_1 = N_2 = N_3$, i.e. the transformation ratio is equal to 1, $r_1$, $r_2$ and $r_3$ may all be equal to $3r$.

In FIG. 7, the arrangement is similar except for the fact that the magnetic circuit is arranged in a symmetrical manner.

FIG. 8 shows how it is possible to eliminate the errors through a single transformer. The arrangement is the same as in the case of FIG. 6 except for the fact that the transformer includes a number $n$ of windings fitted over a same magnetic circuit. As in the case of FIG. 6, assuming $N_1$, $N_2$, $N_3$ . . . designate the number of convolutions in each of the windings, the resistances $r_1, r_2, r^3$ . . . should satisfy the formula $$\frac{r_1}{N_1} = \frac{r_2}{N_2} = \frac{r_3}{N_3} \ldots = r\left(\frac{1}{N_1} + \frac{1}{N_2} + \ldots\right)$$

In particular, if $N_1=N_2=N_3$ with a transformation ratio equal to 1, each of the resistances $r_1$, $r_2$, $r_3$ may be equal to $n \times r$.

Obviously, many modifications may be brought to the arrangements which have just been described.

In particular, in the case where it is desired to execute measurements between electrodes dipping inside a borehole, the following procedure should be followed:

In such a case, the coupling resistance $r$ varies when the electrode system is caused to move inside the borehole, since said resistance includes, on the one hand, the resistance of the cable which varies slightly during the unwinding, chiefly under the action of the modifications in temperature and, on the other hand, the common resistances constituted by the resistance inserted between certain pairs of electrodes, said common resistances being formed by the sludge settling inside the bore-hole. This latter cause of modification is not generally very objectionable. As to the variations in resistance ascribable to temperature, their importance may be reduced by selecting for $r$ an average value within the limits of operation.

What I claim is:

1. In a system for defining simultaneously a plurality of independent parameters through the measurement of differences in potential, the combination of a plurality of current-sensitive measuring instruments, and a plurality of signal-current carrying circuits respectively connected to said instruments including inductive coupling means and a common return lead having electrical resistance to the flow of current, said common return lead being connected respectively to said instruments through said coupling means, said coupling means having a plurality of windings respectively connected to each of said circuits for mutually inductively coupling said circuits together and being responsive to current flowing in said common return lead from said circuits for inducing signal currents into said circuits to cancel in each circuit at least a portion of the current flowing therein which is a function of the voltage drop developed across said common resistive return lead by the signal currents flowing in the other of said circuits.

2. In a system for defining simultaneously a plurality of independent parameters through the measurement of differences in potential between a plurality of spaced-apart points susceptible of being at different electrical potentials, the combination of two current-sensitive measuring instruments, and two signal-current carrying circuits respectively connected to said instruments including a common return lead having electrical resistance to the flow of current and inductive coupling means having a plurality of windings, said common return lead being connected at one terminal thereof to one of said spaced-apart points, said instruments being connected respectively at one terminal thereof to another of said points, said windings being respectively connected between another terminal of said common return lead and different ones of said instruments for mutually inductively coupling said two circuits together, said coupling means being responsive to current flowing in said common return lead from said circuits for inducing in each of said two circuits compensating currents to cancel at least a portion of the current flowing therein which is a function of the voltage drop developed across said common resistive return lead by the signal currents flowing in the other of said circuits.

3. In a system for defining simultaneously a plurality of independent parameters through the measurement of differences in potential between a plurality of spaced-apart points susceptible of being at different electrical potentials, the combination of a plurality of current-sensitive measuring instruments and a plurality of signal-current carrying circuits connected to said measuring instruments including a common return lead having electrical resistance to the flow of current connected to one of said points at one terminal thereof and at least one transformer including a plurality of windings connected respectively between another terminal of said common return lead and one terminal of a respective one of said instruments, said instruments having another terminal thereof connected respectively to one of said other points, said circuits being mutually inductively coupled therebetween through said plurality of windings for inducing signal currents therein to cancel in each circuit at least a portion of the current flowing therein which is a function of the voltage drop developed across said common resistive return lead by the signal currents flowing in the other of said circuits, and shunt resistance elements connected to said plurality of windings to control the voltages developed respectively in said circuits, the resistance values of said common return lead and said shunt elements being in the following relation:

$$m \frac{r_2 r_1}{r_1 + m^2 r_2} = r$$

wherein $r$ designates the average resistance of said common return lead, $m$ designates the transformation ratio of said transformer, and $r_1$ and $r_2$ designate the shunt resistance elements.

4. In a system for defining simultaneously a plurality of independent parameters through the measurement of differences in potential between a plurality of spaced-apart points susceptible of being at different electrical potentials, the combination of two current-sensitive measuring instruments, two signal-current carrying circuits connected to said instruments including a common return lead having electrical resistance to the flow of current connected to one of said points and a transformer including a plurality of windings connected respectively between one terminal of said common return lead and one terminal of a respective one of said instruments, said instruments having another terminal thereof connected respectively to one of said other points, said circuits being mutually inductively coupled therebetween through said plurality of windings, and at least one shunt resistance element connected respectively to each of said windings to control the voltage in said circuits, said transformer having a transformation ratio of unity and each of said shunt elements having a value equal to twice the average resistance of said common return lead, said windings inducing signal currents in said two circuits to cancel in each circuit at least a portion of the current flowing therein which is a function of the voltage drop developed across said common resistive return lead by the signal current flowing in the other of said circuits.

5. In a system for defining simultaneously a plurality of independent parameters through the measurement of differences in potential between a plurality of spaced-apart points susceptible of being at different electrical potentials, the combination of two current-sensitive measuring instruments, first and second signal-current carrying circuits connected respectively to said instruments, said circuits including a common return lead having electrical resistance to the flow of current connected to one of said points at one terminal thereof, and a transformer including a plurality of windings connected respectively between another terminal of said common return lead and one terminal of a respective one of said instruments, said instruments having another terminal thereof connected respectively to one of said other points, said first and second circuits being mutually inductively coupled therebetween through said windings, and shunt resistance elements connected across at least one of said windings to control the voltage in said circuits, said transformer having a transformation ratio of unity and said elements having resistance values equal to the average resistance of said common return lead, said windings inducing signal currents in said first and second circuits to cancel in each circuit at least a portion of the current flowing therein which is a function of the voltage drop developed in said common resistive return lead by the signal currents flowing in the other of said circuits.

6. In a system for defining simultaneously a plurality of independent parameters through the measurement of differences in potential between a plurality of spaced-apart points susceptible of being at different electrical potentials, the combination of a plurality of current-sensitive measuring instruments, a plurality of parallel-connected signal-carrying circuits respectively connected to said instruments including inductive coupling means and a common return lead having electrical resistance to current flow, said common return lead having one terminal thereof connected to one of said points and another terminal thereof connected to one terminal of a respective one of said instruments through said coupling means, said instruments having another terminal thereof connected respectively to one of the other of said points, said coupling means having a plurality of windings respectively connected in series with said instruments and in parallel with respect to each other in said circuits for mutually inductively coupling said circuits together and being responsive to current flowing in said common return lead from said circuits for inducing signal currents into each of said circuits to compensate for the voltage drop developed across said common resistive return lead by the signal currents flowing in the other of said circuits.

7. In a system for defining simultaneously a plurality of independent parameters through the measurement of differences in potential between a plurality of spaced-apart points susceptible of being at different electrical potentials, the combination of a plurality of current-sensitive measuring instruments, and a plurality of parallel-connected signal-carrying circuits respectively connected to said instruments including inductive coupling means and a common return lead having electrical resistance to current flow, said common return lead having one terminal thereof connected to one of said points and another terminal thereof connected to one terminal of respective ones of said instruments through said coupling means, said instruments having another terminal thereof connected respectively to one of the other of said points, said coupling means having pairs of windings respectively connected between said common return lead and one terminal of respective ones of said instruments for mutually inductively coupling said parallel-connected circuits together, and shunt resistance elements connected to each winding of said coupling means, the transformation ratio of each of said pairs of windings and the values of said shunt resistance elements being related to each other and to said resistive common return lead by the equation:

$$m\frac{r_2 r_1}{r_1 + m^2 r_2} = r$$

where $m$ designates the transformation ratio of each of said pairs of windings, $r$ designates the average resistance of said common return lead, and $r_1$ and $r_2$ designate the value of said resistance elements connected to each pair of said windings, said windings inducing signal currents in each of said circuits to cancel at least a portion of the current flowing therein which is a function of the voltage drop developed across said common resistive return lead by the signal currents flowing in the other of said circuits.

8. In a system as claimed in claim 7 wherein said inductive coupling means includes a transformer having a plurality of windings wound on a single core for inducing signal currents in each of said circuits depending upon current flowing in said common resistive return lead.

9. In a system for defining simultaneously a plurality of independent parameters through the measurement of differences in potential between a plurality of spaced-apart points susceptible of being at different electrical potentials, the combination of a plurality of current-sensitive measuring instruments, a plurality of parallel-connected signal-carrying circuits respectively connected to said instruments including inductive coupling means and a common return lead having electrical resistance to current flow, said common return lead having one terminal thereof connected to one of said points and another terminal thereof connected to one terminal of respective ones of said instruments through said coupling means, said instruments having another terminal thereof connected respectively to one of said other joints, said coupling means including a plurality of windings wound on a core with said windings respectively connected between said other terminal of said common return lead and said one terminal of each of said instruments for mutually inductively coupling said circuits together, and shunt resistance elements connected to each of said windings, said resistance elements and the number of turns of said windings being related to each other and to the resistance of said common return lead by the equation:

$$\frac{r_1}{N_1} = \frac{r_2}{N_2} = \frac{r_n}{N_n} = r\left(\frac{1}{N_1} + \frac{1}{N_2} \cdots \frac{1}{N_n}\right)$$

where $r$ designates the average resistance of said common return lead, $r_1$, $r_2$, and $r_n$ designate up to $n$ resistance elements connected to said windings, and $N_1$, $N_2$ and $N_n$ designate the number of turns of each of said windings, said windings inducing signal currents in each of said circuits to cancel in each circuit at least a portion of the current flowing therein which is a function of the voltage drop developed across said common resistive return lead by the signal currents flowing in the other of said circuits.

10. In a system for defining simultaneously a plurality of independent parameters through the measurement of differences in potential, the combination of a plurality of current-sensitive measuring instruments, and a plurality of signal-current carrying circuits respectively connected to said instruments including inductive coupling means and a common return lead having electrical resistance to the flow of current, said common return lead being connected to each of said instruments, said coupling means having a plurality of windings respectively connected to each of said circuits for mutually inductively coupling said circuits together and each of said plurality of windings being responsive, respectively, to current flowing in each of said circuits and through said common return lead to cancel in each circuit at least a portion of the current flowing therein from the signal currents flowing in the other of said circuits which cancelling signal currents are a function of the voltage drop developed across said common resistive return lead.

References Cited in the file of this patent

UNITED STATES PATENTS

| | | |
|---|---|---|
| 560,762 | Stone | May 26, 1896 |
| 665,923 | McBerty | Jan. 15, 1901 |
| 1,254,473 | Campbell | Jan. 22, 1918 |
| 2,024,280 | Edwards et al. | Dec. 17, 1935 |
| 2,283,891 | Layne | May 19, 1942 |
| 2,623,916 | Welz | Dec. 30, 1952 |

FOREIGN PATENTS

| | | |
|---|---|---|
| 159,314 | Australia | Oct. 14, 1954 |

OTHER REFERENCES

Germany, Patentanmeldung S40790, VIIIc/21e, printed Mar. 15, 1956.